(12) United States Patent
Prettyman

(10) Patent No.: US 9,022,397 B1
(45) Date of Patent: May 5, 2015

(54) ADAPTER SYSTEM FOR WALKER

(71) Applicant: Raymon Earl Prettyman, Costa Mesa, CA (US)

(72) Inventor: Raymon Earl Prettyman, Costa Mesa, CA (US)

( * ) Notice: Subject to any disclaimer, the term of this patent is extended or adjusted under 35 U.S.C. 154(b) by 0 days.

(21) Appl. No.: 14/510,317

(22) Filed: Oct. 9, 2014

Related U.S. Application Data

(60) Provisional application No. 61/888,676, filed on Oct. 9, 2013.

(51) Int. Cl.
*B62B 3/00* (2006.01)
*B62B 5/04* (2006.01)

(52) U.S. Cl.
CPC .............. *B62B 5/0447* (2013.01); *B62B 3/008* (2013.01)

(58) Field of Classification Search
USPC .............. 280/87.021, 87.05, 642, 647, 47.4, 280/304.1, 250.1, 47.38
See application file for complete search history.

(56) References Cited

U.S. PATENT DOCUMENTS

| | | |
|---|---|---|
| 3,625,237 A | 12/1971 | Wertz |
| 3,999,778 A | 12/1976 | Markiel |
| 4,248,256 A | 2/1981 | Thomas |
| 4,342,465 A | 8/1982 | Stillings et al. |
| 4,510,956 A | 4/1985 | King |
| 4,907,794 A | 3/1990 | Rose et al. |
| 4,941,497 A | 7/1990 | Prather et al. |
| 4,988,138 A | 1/1991 | Danna et al. |
| 5,224,717 A | 7/1993 | Lowen et al. |
| 5,275,187 A | 1/1994 | Davis et al. |
| 5,657,783 A | 8/1997 | Sisko et al. |
| 5,671,765 A | 9/1997 | Hagberg et al. |
| 5,778,996 A | 7/1998 | Prior et al. |
| 6,099,002 A | 8/2000 | Uchiyama et al. |
| D451,053 S | 11/2001 | Hallgrimsson |
| 6,311,708 B1 | 11/2001 | Howle |
| 6,318,392 B1 | 11/2001 | Chen |
| 6,494,469 B1 | 12/2002 | Hara et al. |
| 6,837,503 B2 | 1/2005 | Chen |
| 7,044,361 B2 | 5/2006 | March |
| 7,422,025 B1 | 9/2008 | Waldstreicher et al. |
| 7,494,138 B2 * | 2/2009 | Graham .................... 280/87.021 |
| 7,547,027 B2 | 6/2009 | Bohn |
| 7,726,327 B2 | 6/2010 | Battiston |
| 7,935,030 B1 | 5/2011 | Nesbitt |
| 8,251,079 B1 | 8/2012 | Lutz et al. |
| 8,251,932 B2 | 8/2012 | Fout |
| 2005/0156395 A1 | 7/2005 | Bohn |
| 2007/0023073 A1 | 2/2007 | Su |
| 2009/0310364 A1 | 12/2009 | Turner |
| 2010/0258152 A1 | 10/2010 | Lin et al. |
| 2012/0298160 A1 | 11/2012 | Hamilton |
| 2012/0299272 A1 | 11/2012 | Liu |
| 2012/0326409 A1 | 12/2012 | Corso et al. |
| 2013/0014790 A1 | 1/2013 | Van Gerpen |
| 2013/0056945 A1 | 3/2013 | Huang |

* cited by examiner

*Primary Examiner* — John Walters
*Assistant Examiner* — James Triggs
(74) *Attorney, Agent, or Firm* — Plager Schack LLP

(57) ABSTRACT

An adapter system can be used on a walker having a walker tube attached to a walker telescoping tube. The adapter system has an attachment assembly that is configured to connect the adapter system to the walker telescoping tube. A bracket assembly is connected to the attachment assembly. The bracket assembly is configured in a first mode of operation to provide an armrest support above the walker telescoping tube and in a second mode of operation to be located away from the walker telescoping tube. A brake assembly is attached to a bracket assembly. The brake assembly is configured to enable movement of a brake adjustment screw to stop or slow movement of the walker and also act as a means of controlling the distance between the brake handle and the vertical hand handle.

5 Claims, 5 Drawing Sheets

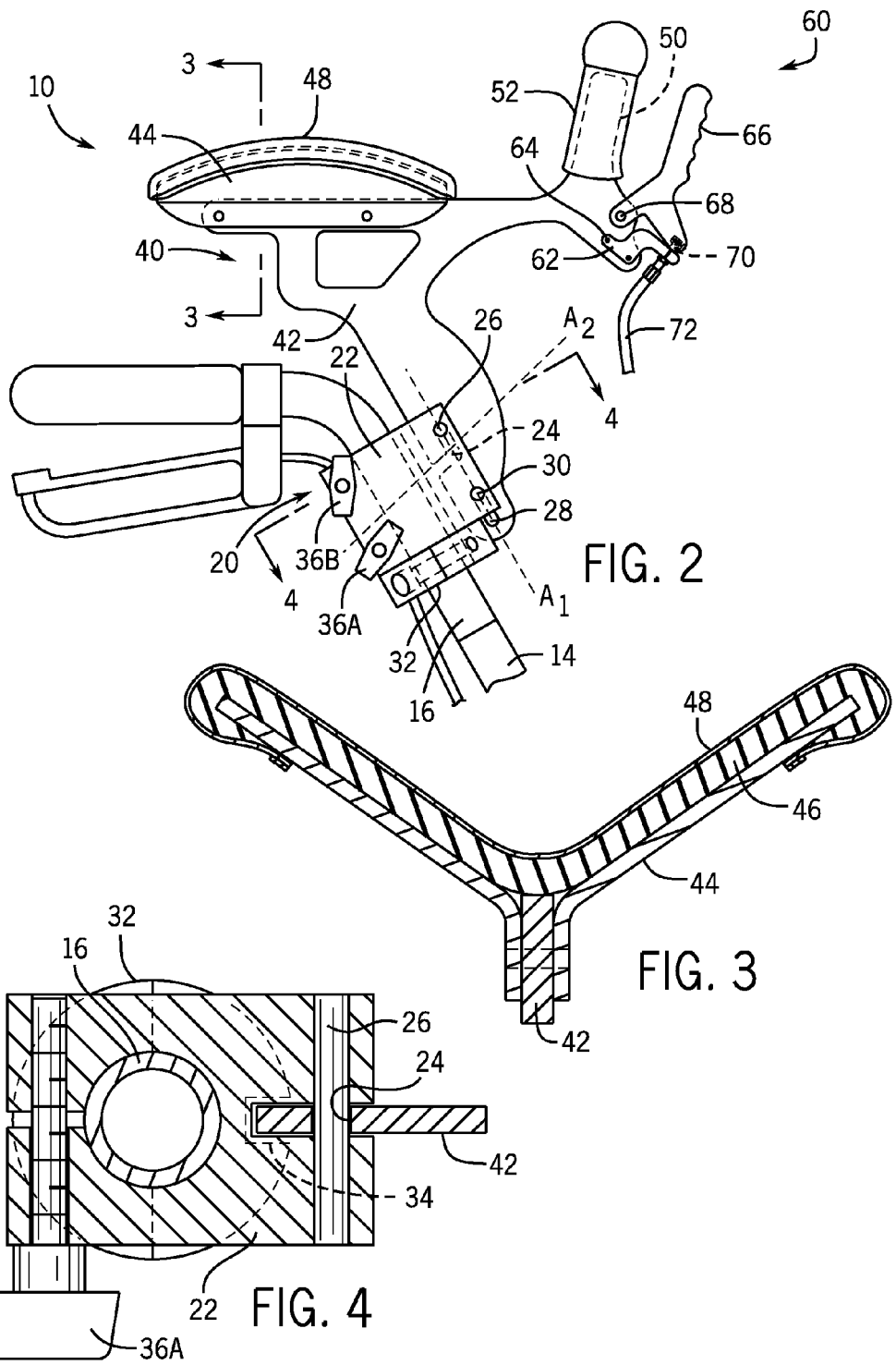

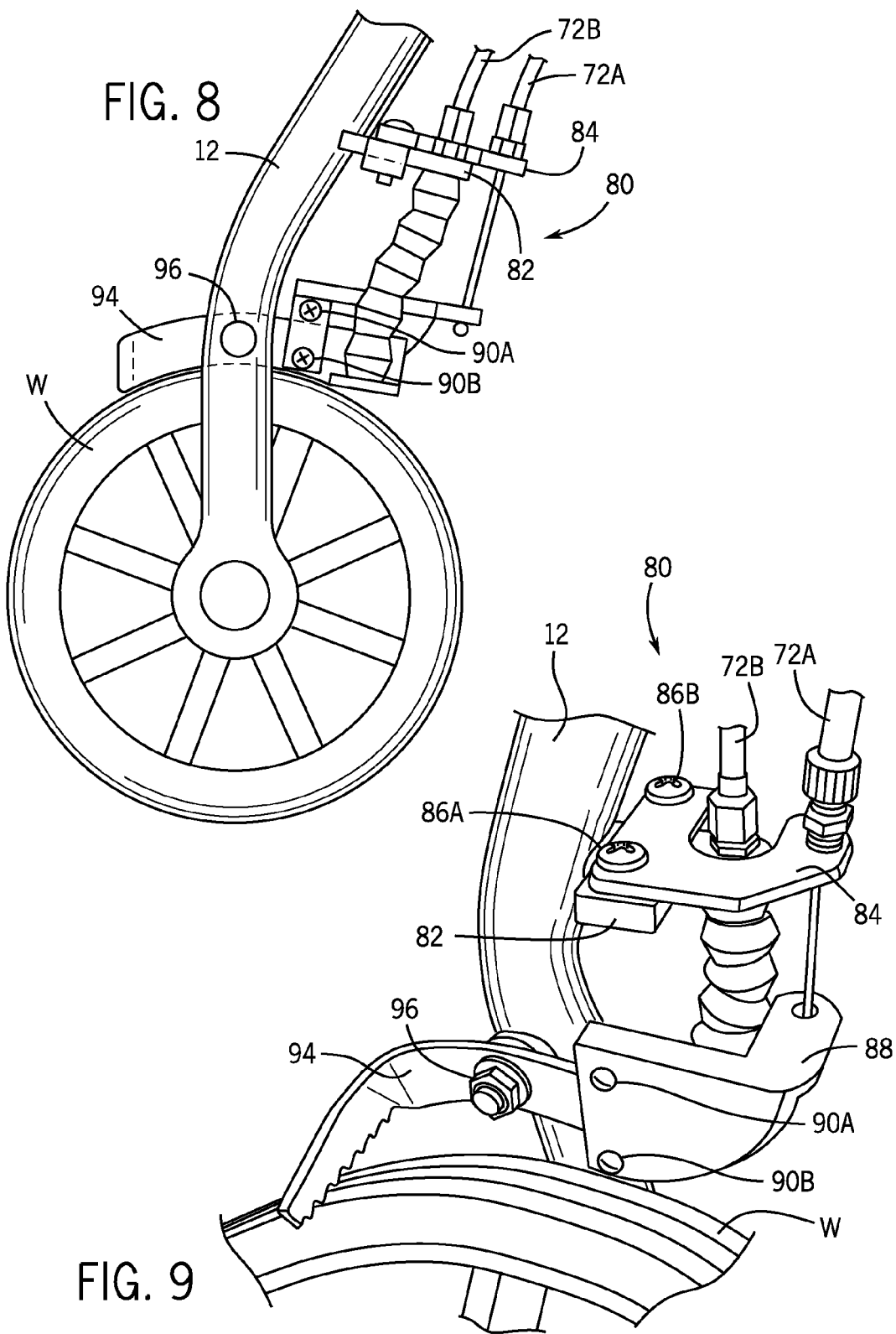

ADAPTER SYSTEM FOR WALKER

RELATED APPLICATION

This application claims priority to provisional patent application U.S. Ser. No. 61/888,676 filed on Oct. 9, 2013, the entire contents of which is herein incorporated by reference.

BACKGROUND

The embodiments herein relate generally to mobility equipment.

Prior to embodiments of the disclosed invention, the standard rolling walker method of use caused strain and pain on a user's wrist, hands, arms, back and body. For instance in U.S. Pat. No. 7,547,027 and U.S. Patent Application 2005/0156395 the users hands are directed downward and over the arm rests and instead of above the arm rests. Further, there is no theory of how to rotate the arm rests. Additionally, there is no attachment of a vertical frame to an adapter body to expedite this functionality. Embodiments of the disclosed invention solve this problem.

SUMMARY

An adapter system can be used on a walker having a walker tube attached to a walker telescoping tube. The adapter system has an attachment assembly that is configured to connect the adapter system to the walker telescoping tube. A bracket assembly is connected to the attachment assembly. The bracket assembly is configured in a first mode of operation to provide an armrest support above the walker telescoping tube and in a second mode of operation to be located away from the walker telescoping tube. A brake assembly is attached to a bracket assembly. The brake assembly is configured to enable movement of a brake lever to stop or slow movement of the walker and also to act as a means of changing the distance between the brake handle and the hand grip handle. A second brake adjustment barrel is located at the other end of the cable for further adjustment.

In some embodiments, the attachment assembly further comprises an vertical bracket latching pin and a pivot pin. The latching pin and pivot pin are configured to accommodate the latching pin slot and the pivot pin slot in the vertical bracket, shaft collar is mechanically coupled to the vertical bracket. The shaft collar further comprises a shaft collar stop notch. A first mounting screw and a second mounting screw are configured to tighten the vertical bracket onto the walker telescoping tube in a way to allow a desired amount of rotation of the vertical bracket.

The bracket assembly includes a bracket plate mechanically coupled to the latching pin and the pivot pin. The armrest support is mechanically coupled to the bracket plate. An armrest pad is mechanically coupled to the armrest support. An armrest cover is mechanically coupled to the armrest pad. A bracket vertical handle is mechanically coupled to the bracket plate. A bracket handle padding is mechanically coupled to the bracket handle.

The brake assembly further includes a brake bracket mechanically coupled to the bracket plate with at least one brake bracket pin. A brake handle is mechanically coupled to the bracket plate with a brake handle pin. A brake line is attached to the brake handle. The brake adjustment screw travel through the brake bracket and rests under the brake lever giving it the ability to adjust the brake handle closer or farther away from the vertical hand handle. The other end of the brake cable also has a barrel adjuster for fine tuning.

BRIEF DESCRIPTION OF THE FIGURES

The detailed description of some embodiments of the invention is made below with reference to the accompanying figures, wherein like numerals represent corresponding parts of the figures.

FIG. 2 is a detail side elevation view of the invention.
FIG. 3 is a cross-sectional view taken on line 3-3 of FIG. 2.
FIG. 4 is a cross-sectional view taken on line 4-4 of FIG. 2.
FIG. 8 is a side elevation view of the brake assembly.
FIG. 9 is a perspective view of the brake assembly in use.

DETAILED DESCRIPTION OF CERTAIN EMBODIMENTS

Figure 1:
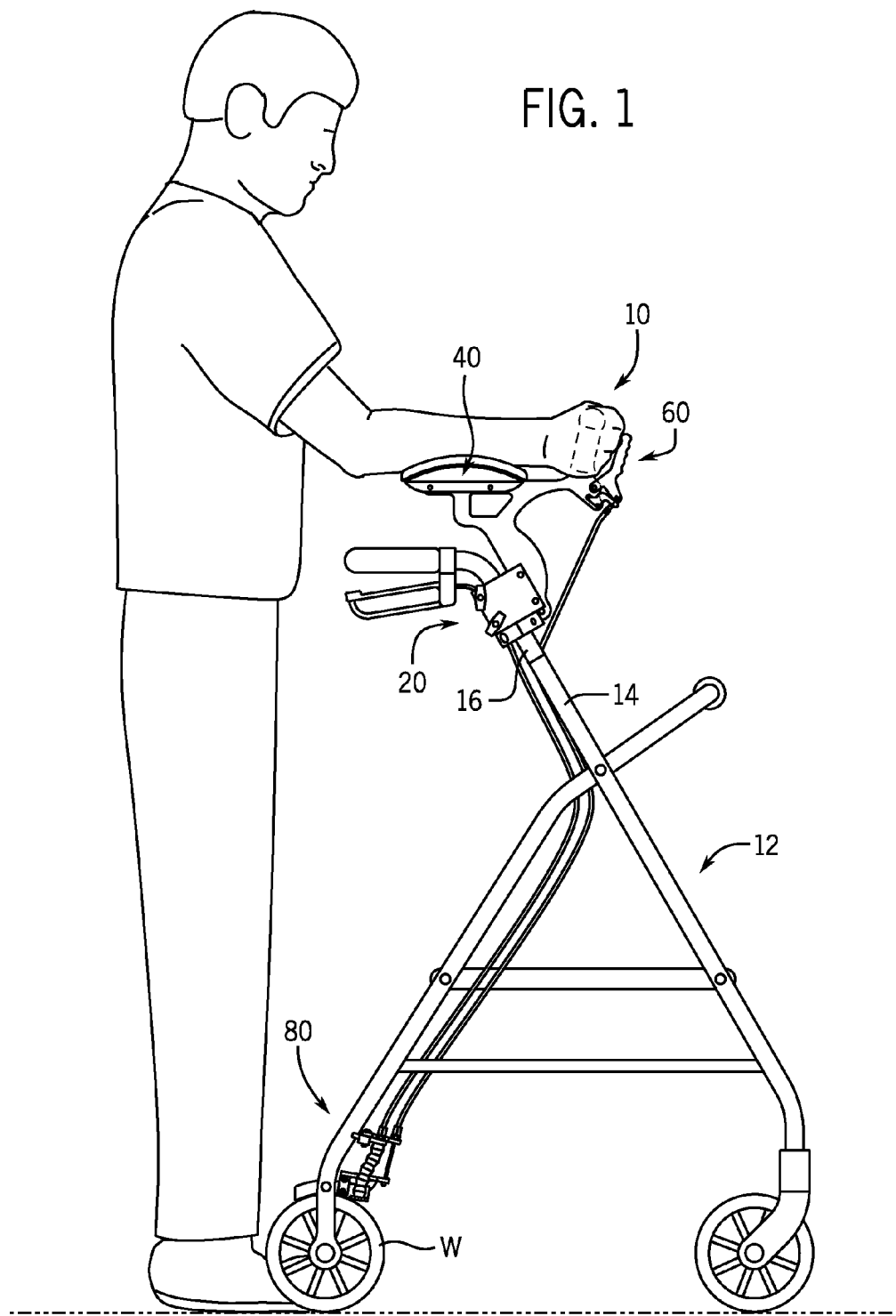
FIG. 1 is a side elevation view of the invention in use.

By way of example, and referring to FIG. 1, adapter system 10 is mechanically coupled to walker 12. Walker 12 further comprises walker tube 14 through which walker telescoping tube 16 can extend or retract from. Walker 12 further comprises wheel W. Adapter system 10 further comprises attachment assembly 20 connected to bracket assembly 40. Bracket assembly 40 is attached to brake assembly 60. Brake assembly 60 is mechanically coupled to wheel brake 80.

Turning to FIG. 2, FIG. 3 and FIG. 4, attachment assembly 20 further comprises vertical bracket 22 further comprising latching pin retainer slot 24 through which latching pin 26 can fit. Vertical bracket 22 further comprises pivot slot 28 through which pivot pin 30 can fit. Vertical bracket 22 is mechanically coupled to shaft collar 32 which further comprises shaft collar stop notch 34. Vertical bracket 22 can be tightened onto walker telescoping tube 16 with first mounting screw 36A and second mounting screw 36B.

Figure 5:
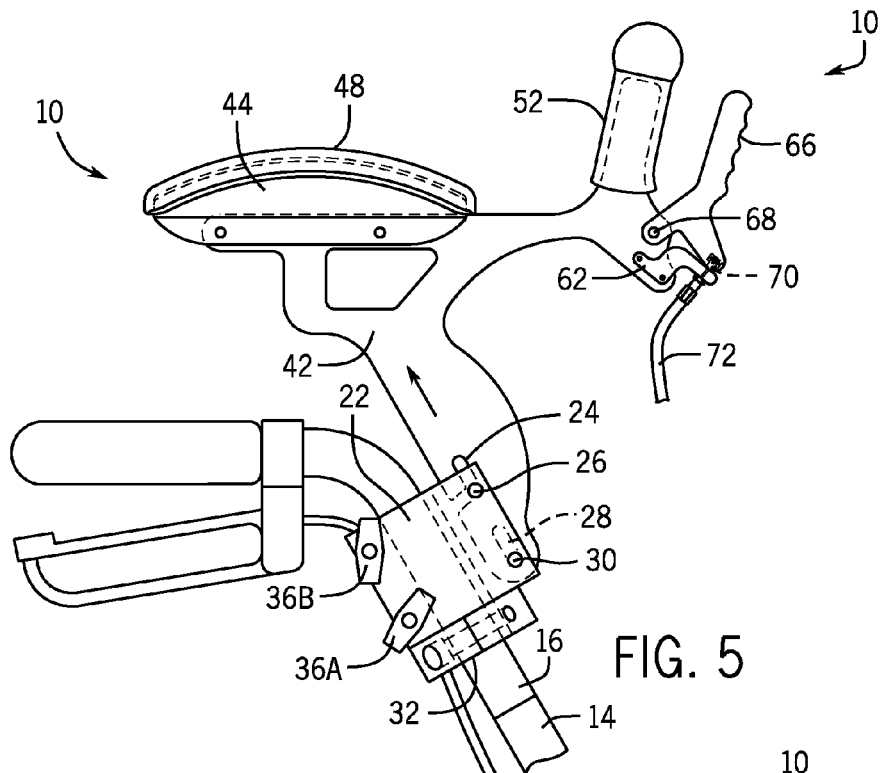
FIG. 5 is a detail side elevation view, similar to FIG. 2, of the invention in an extended mode.

Pivot slot 28 is arranged such that pivot pin 30 can slide on first axis A1 on vertical bracket 22. To contrast, latching pin retainer slot 24 is arranged such that latching pin 26 can slide on both the first axis A1 and also on second axis A2. This enables a user to operate adapter system 10 in a first mode of operation where vertical bracket 22 is locked in a position parallel to walker tube 14 as shown in FIG. 5.

Bracket assembly 40 further comprise bracket plate 42. Bracket plate 42 is mechanically coupled to latching pin 26 and pivot pin 30. Bracket plate 42 is further mechanically coupled to armrest support 44. Armrest support 44 is mechanically coupled to armrest pad 46. Armrest pad 46 is covered with armrest cover 48. Bracket plate 42 is further mechanically coupled to bracket handle 50 which is covered in bracket handle padding 52.

Figure 6:
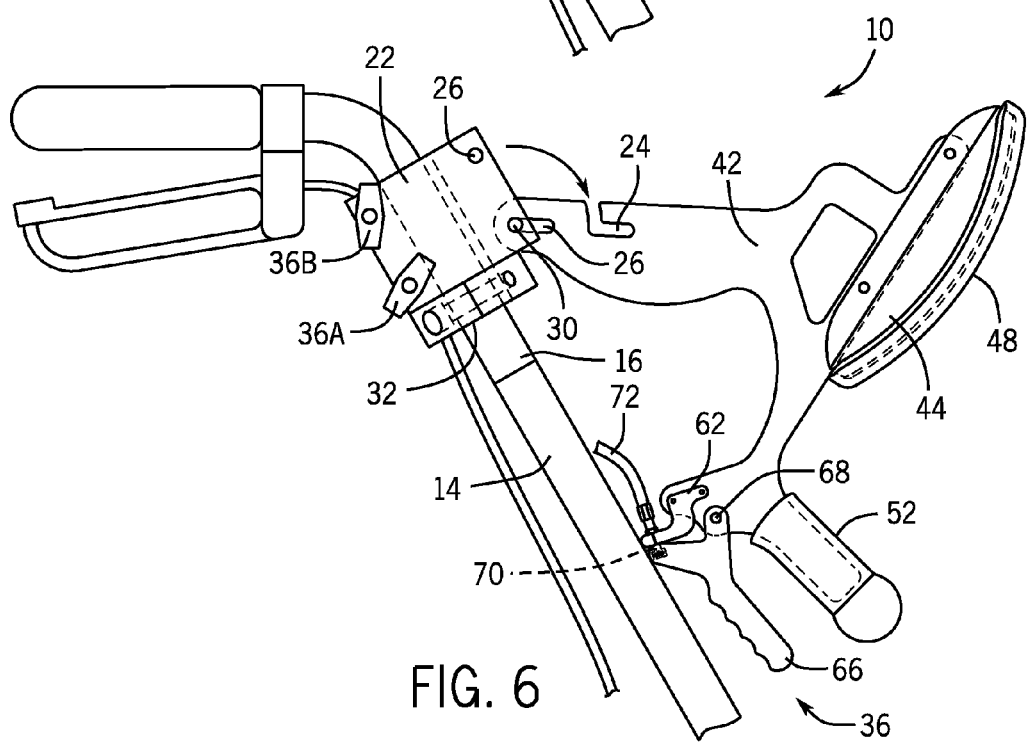
FIG. 6 is a detail side elevation view, similar to FIG. 5, of the invention in a downwardly rotated mode.
Figure 7:
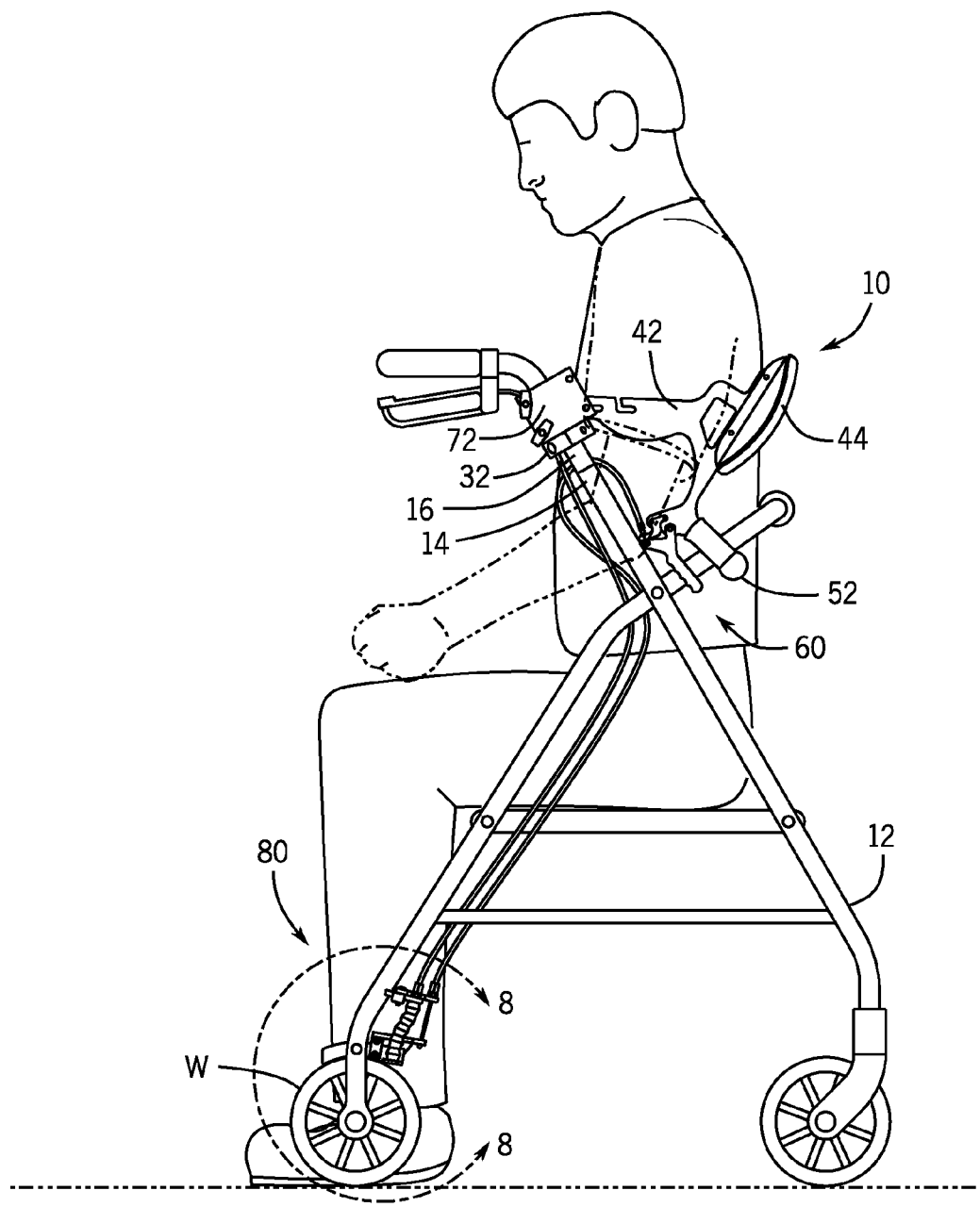
FIG. 7 is a side elevation view of the invention in the downwardly rotated mode of FIG. 6.

In some embodiments, the vertical adapter bracket is lifted and rotated such that latching pin retainer slot 24 is opened from latching pin 26. This enables the user to rotate the vertical bracket 22 so that it is no longer parallel to walker tube 14 as shown in FIG. 6. This arrangement further enables a human user to sit on walker 12 clear of adapter system 10 as shown in FIG. 7.

Brake assembly 60 comprises brake bracket 62 mechanically coupled to bracket plate 42 with at least one brake bracket pin 64. Bracket plate 42 is further mechanically coupled to brake handle 66 with brake handle pin 68. Brake adjustment screw 70 travels through brake bracket 62 and rests under the brake handle 66. Brake handle 66 is attached to brake line 72. When a user pulls brake handle 66 toward bracket handle 50, a brake engages on the wheel of walker 12 stopping or slowing movement of walker 12. The operation of a handbrake at the wheel is not shown. See photos and or drawings.

This arrangement leads to at least two distinct advantages over the prior art. First, adapter system 10 transforms walker 12 in just a minute or two into a comfortable body support physical therapy tool while creating a pain relieving walking experience. Second, all of the functionality of walker 12 remains intact such as sitting, folding, etc. Absolutely nothing is lost when adapter system 10 is added to walker 12. It is designed in a way that it never needs to be removed. Brake assembly 60 has a separate brake handle 66 forward of each bracket handle 50 for easy access and has no effect on the other brakes. All systems work alternately and independently.

Turning to FIG. 8 and FIG. 9, brake line 72 is now shown as first brake line 72A and second brake line 72B. Wheel brake 80 further comprises inner brake plate 82 mechanically coupled to walker 12. Inner brake plate 82 is mechanically coupled to upper brake plate 84 with first inner brake plate fastener 86A and second inner brake plate fastener 86B. Lower brake plate 88 is mechanically coupled to walker 12 with first lower brake plate fastener 90A and second lower brake plate fastener 90B. Brake arm 94 is rotatably coupled to walker 12 with bolt 96.

Second brake line 72B is mechanically coupled to an expansion spring that pushes brake arm 94 away from wheel W such that wheel W can rotate without the additional friction of brake arm 94. However, when first brake line 72A is pulled upward, brake arm 94 is rotated onto wheel W causing addition friction of brake arm 94 and inhibiting movement of wheel W.

Persons of ordinary skill in the art may appreciate that numerous design configurations may be possible to enjoy the functional benefits of the inventive systems. Thus, given the wide variety of configurations and arrangements of embodiments of the present invention the scope of the invention is reflected by the breadth of the claims below rather than narrowed by the embodiments described above.

What is claimed is:

1. An adapter system for a walker having a walker tube attached to a walker telescoping tube; the adapter system comprising:
    an attachment assembly; configured to connect the adapter system to the walker telescoping tube;
    a bracket assembly connected to the attachment assembly; wherein the bracket assembly is configured in a first mode of operation to provide an armrest support above the walker telescoping tube and in a second mode of operation to be located away from the walker telescoping tube;
    a brake assembly attached to the bracket assembly; wherein the brake assembly is configured to enable movement of a brake adjustment screw to stop the movement of the walker;
    an vertical bracket further comprising latching pin retainer slot and a pivot slot; wherein the latching pin retainer slot is configured to accommodate a latching pin and the pivot slot is configured to accommodate a pivot pin
    a shaft collar mechanically coupled to the vertical bracket; wherein the shaft collar further comprises a shaft collar stop notch;
    a first mounting screw and a second mounting screw configured to tighten the vertical bracket onto the walker telescoping tube.

2. The adapter system of claim 1, wherein the bracket assembly further comprises:
    a bracket plate, mechanically coupled the latching pin and the pivot pin;
    the armrest support, mechanically coupled to the bracket plate;
    an armrest pad, mechanically coupled to the armrest support;
    an armrest cover, mechanically coupled to the armrest pad;
    a bracket handle, mechanically coupled to the bracket plate; and
    a bracket handle padding mechanically coupled to the bracket handle.

3. The adapter system of claim 2, wherein the brake assembly further comprises:
    a brake bracket mechanically coupled to the bracket plate with at least one brake bracket pin;
    a brake handle mechanically coupled to the bracket plate with a brake handle pin;
    a brake line, attached to the brake handle;
    wherein the brake adjustment screw is configured travels through the brake bracket and rests under the brake handle.

4. The adapter system of claim 3, wherein the brake assembly is further mechanically coupled to a wheel brake.

5. The adapter system of claim 4, wherein the wheel brake further comprises:
    an inner brake plate, mechanically coupled to the walker;
    a upper brake plate, mechanically coupled to the inner brake plate;
    a lower brake plate, mechanically coupled to the walker
    a brake arm, rotatably coupled to the walker;
    wherein the brake line is configured to rotate the brake arm into a wheel on the walker to prevent the movement of the wheel.

* * * * *